United States Patent

Asada et al.

[11] Patent Number: 5,826,691
[45] Date of Patent: Oct. 27, 1998

[54] CLUTCH COVER ASSEMBLY HAVING A DIAPHRAGM SPRING AND A SECONDARY BIASING SPRING WORKING IN TANDEM

[75] Inventors: Masaaki Asada, Ibaraki; Toshiya Kosumi, Kadoma; Hideyuki Imanaka, Moriguchi; Hiroshi Mizukami, Neyagawa, all of Japan

[73] Assignee: EXEDY Corporation, Neyagawa, Japan

[21] Appl. No.: 811,996

[22] Filed: Mar. 5, 1997

[30] Foreign Application Priority Data

Mar. 8, 1996 [JP] Japan .................................. 8-051554
Jun. 13, 1996 [JP] Japan .................................. 8-152482

[51] Int. Cl.⁶ ............................................. F16D 13/71
[52] U.S. Cl. .................................. 192/89.24; 192/70.27
[58] Field of Search ............................ 192/89.22, 89.24, 192/89.25, 70.27, 109 A

[56] References Cited

U.S. PATENT DOCUMENTS

| | | | |
|---|---|---|---|
| 4,727,971 | 3/1988 | Janda et al. | 192/70.27 |
| 5,400,887 | 3/1995 | Mizukami et al. | |
| 5,501,312 | 3/1996 | Mizukami et al. | |
| 5,551,547 | 9/1996 | Mizukami et al. | |
| 5,632,365 | 5/1997 | Maucher | 192/89.24 X |

FOREIGN PATENT DOCUMENTS

| | | |
|---|---|---|
| 2507268 | 12/1982 | France . |
| 4326501 | 2/1994 | Germany . |
| 4430249 | 3/1995 | Germany . |

*Primary Examiner*—Richard M. Lorence
*Attorney, Agent, or Firm*—Shinjyu An Intellectual Property Firm

[57] ABSTRACT

A clutch cover assembly (1) has release load characteristics which have been smoothed out or flattened by using a secondary conical spring (8) in combination with a diaphragm spring (7). To reduce the overall number of parts in the assembly 1, the pressure plate (6) includes axially extending pins (10) which extend through holes formed in the diaphragm spring (7). The pins (10) are also engaged with a portion of the conical spring (8).

2 Claims, 8 Drawing Sheets

CLUTCH COVER ASSEMBLY HAVING A DIAPHRAGM SPRING AND A SECONDARY BIASING SPRING WORKING IN TANDEM

BACKGROUND OF THE INVENTION

1. Field of the Invention

The present invention relates to a clutch cover assembly, and more particularly to a clutch cover assembly using a diaphragm spring and a secondary spring for urging a pressure plate into engagement with a clutch disc.

2. Description of the Related Art

In general, a clutch cover assembly is mounted on a flywheel of an engine and is used to transmit a drive torque of an engine to a transmission. Such a clutch cover assembly is mainly composed of a clutch cover fixed to the flywheel, a pressure plate for clamping a friction portion of a clutch disc into friction engagement with a surface the flywheel, and a spring member for biasing the pressure plate toward the flywheel.

Figure 9:
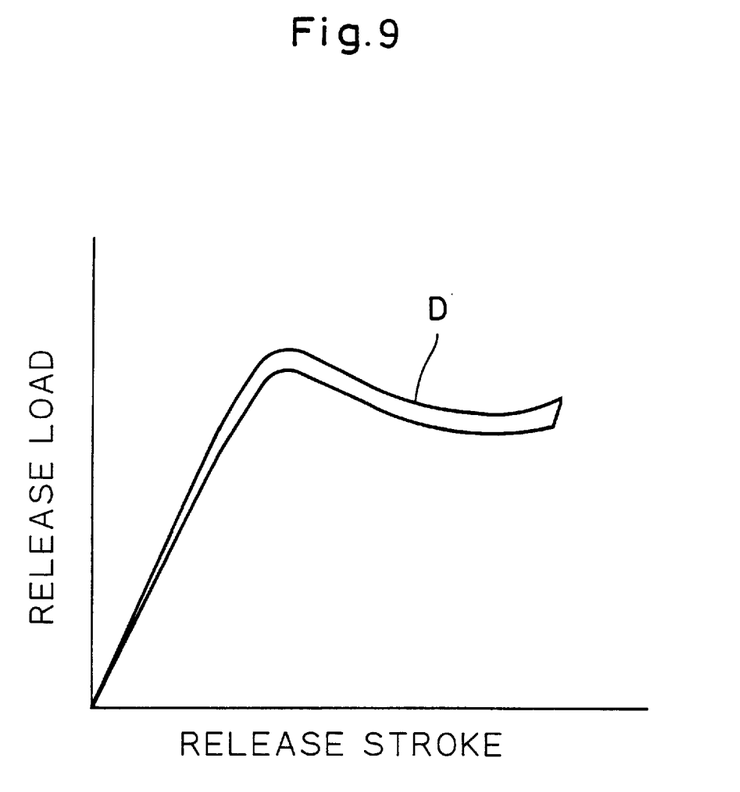
FIG. 9 is a graph showing the release load characteristics of a diaphragm spring.

In general, a diaphragm spring is used as the spring member mentioned above. The diaphragm spring is composed of a disc spring portion and a plurality of lever portions extending radially inwardly from an inner circumferential edge. Thus, the diaphragm spring has a function to bias the pressure plate and is moved to a function to release its spring force from the pressure plate. For instance, such a diaphragm spring typically has a release load characteristic D as shown in FIG. 9. As shown in the graph in FIG. 9, the force required to release engagement with the clutch disc increases at a generally constant rate as the release stroke increases. However, at a certain critical point, the force required to continue deflection of the diaphragm spring decreases gradually.

A clutch cover assembly is known in which, in order to improve the release load characteristics, a secondary conical spring is disposed between the clutch cover and an annular disc portion of the diaphragm spring. The conical spring is compressed between the annular disc portion of the diaphragm spring and the clutch cover. In this case, the biasing force of the diaphragm spring and the conical spring are combined. The force required to deflect the diaphragm spring must include force to deflect both the diaphragm spring and a load of the conical spring. At this time, for instance, the load characteristics may be adjusted by combining the portion of the conical spring where the load is large with the portion of the diaphragm spring where the release load is small, as a result of which it is possible to obtain flat release characteristics where the change of load is suppressed. It is therefore possible to enhance the operational feeling upon the release operation.

In the above-described conventional clutch cover assembly, it is necessary to center the secondary conical spring and prevent rotation of the secondary conical spring. For this reason, conventional configurations include a member such as a support ring is provided on the clutch cover side to thereby attain the retainment of the conical spring. Since the special member such as a support ring should be thus used, the number of the parts is increased.

Typically in a clutch cover assembly, the diaphragm spring is supported in the clutch cover. Generally, there are two methods for supporting the diaphragm spring, i.e., use of stud pins or support the diaphragm spring by tabs provided in the inner circumferential portion of the clutch cover.

There are clutch cover assemblies having stud pin type diaphragm spring type supports where a conical spring is employed. However, the inventors are not aware of any clutch cover assemblies in which the diaphragm spring is supported by the tabs where a conical spring is employed. Similar to that stated above, a problem with conical spring being used in a stud pin type diaphragm spring configuration is the increased number of parts necessary to support and restrain the conical spring and the diaphragm spring.

SUMMARY OF THE INVENTION

An object of the present invention is to provide a clutch cover assembly with a smooth or flatten release load characteristics by using a conical spring, in which the number of parts is decreased.

In accordance with a first aspect of the invention, a clutch cover assembly for engaging and dis-engaging a clutch disc from a flywheel includes a clutch cover configured for connection to a flywheel and a pressure plate disposed within the clutch cover. A diaphragm spring having an annular spring portion formed with an outer circumferential portion is supported by a portion of the clutch cover. An inner circumferential portion of the annular spring portion biases the pressure plate toward the flywheel. The diaphragm spring has a plurality of lever portions extending radially inwardly from the annular spring portion. Further, a plurality of holes are formed in the diaphragm spring, one of the holes formed between each adjacent pair of the lever portions. A plurality of pins extend in a generally axial direction from a surface of the pressure plate toward the clutch cover, each of the pins extending through a corresponding one of the holes in the diaphragm spring. A conical spring is disposed between the diaphragm spring and an inner surface of the clutch cover. An inner circumferential portion of the conical spring biases an inner circumferential portion of the annular spring portion toward the pressure plate, and the inner circumferential portion of the conical spring is formed with a plurality of engagement portions which engage the pins such that the conical spring and the diaphragm spring are circumferentially constrained with respect to the pressure plate.

Preferably, the engagement portions each include a pair of axially extending claw portions in contact with the pins.

In accordance with another aspect of the present invention, a clutch cover assembly for engaging and dis-engaging a clutch disc from a flywheel includes a clutch cover formed to connect to a flywheel, a radially inward portion of the clutch cover formed with a plurality of bent tabs. A pressure plate is disposed within the clutch cover, the pressure plate being formed with a friction surface configured to engage a frictional member against the flywheel. A diaphragm spring is supported by the tabs, the diaphragm spring for biasing the pressure plate toward the flywheel. A conical spring is disposed between the diaphragm spring and the clutch cover, the conical spring formed with a plurality of engagement portions on a radially inward portion thereof. A support plate has a generally annular shape and a portion of the support plate is clamped between the diaphragm spring and the clutch cover. The support plate is formed with a plurality of support portions which engage the conical spring confining axial movement of a portion of the conical spring with respect to the clutch cover. The support plate is further formed with a plurality of claw portions which extend into the engagement portions of the conical spring restricting rotation of the conical spring with respect to the support plate.

Preferably, the support portion of the support plate biases an inner circumferential end of the conical spring toward the clutch cover.

Preferably, a wire ring is disposed between the diaphragm spring and the support plate, the support plate having an engagement portion for engaging the wire ring.

In the clutch cover assembly, the pressure plate is pressed by the diaphragm spring and the conical spring. Upon the release operation, the biasing forces of the diaphragm spring and the conical spring are released. The release load generated in this case is one composed of a release load of the diaphragm spring and a load of the conical spring. At this time, for instance, the overall load characteristics are adjusted by the combination of the range of the load of the conical spring where the response is large, with the portion of the response of diaphragm spring load is small. As a result, it is possible to obtain flat, or even release characteristic response where changes of load characteristics are reduced or eliminated. It is therefore possible to enhance the operational response during the clutch release operation.

Furthermore, in the conical spring, the engagement portion is engaged with the engagement member in order to limit the relative rotation between the diaphragm spring and the pressure plate. Thus, since the rotation preventing effect is attained without using any special member, it is possible to reduce the number of the parts in comparison with the conventional one.

Another object of the present invention is to provide a clutch cover assembly having a good operational response by using components of a tab type clutch cover assembly while using a conical spring.

In this arrangement, since the conical spring biases the diaphragm spring, the release load upon the release operation is one obtained by combining the release load of the diaphragm spring and the release load of the conical spring. For this reason, it is possible to ensure the flat release load characteristics where the load change is suppressed, and it is possible to enhance the operational response during the clutch release operation.

Also, since the support portion of the support plate supports the conical spring, it is possible to suppress the generation of the displacement of the conical spring in the axial direction. Furthermore, since the claw portions of the support plate retain the conical spring and prevent the conical spring from rotating, it is possible to suppress the generation of noises caused by the rotation of the conical spring.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

The present invention will now be described with reference to the accompanying drawings.

Figure 1:
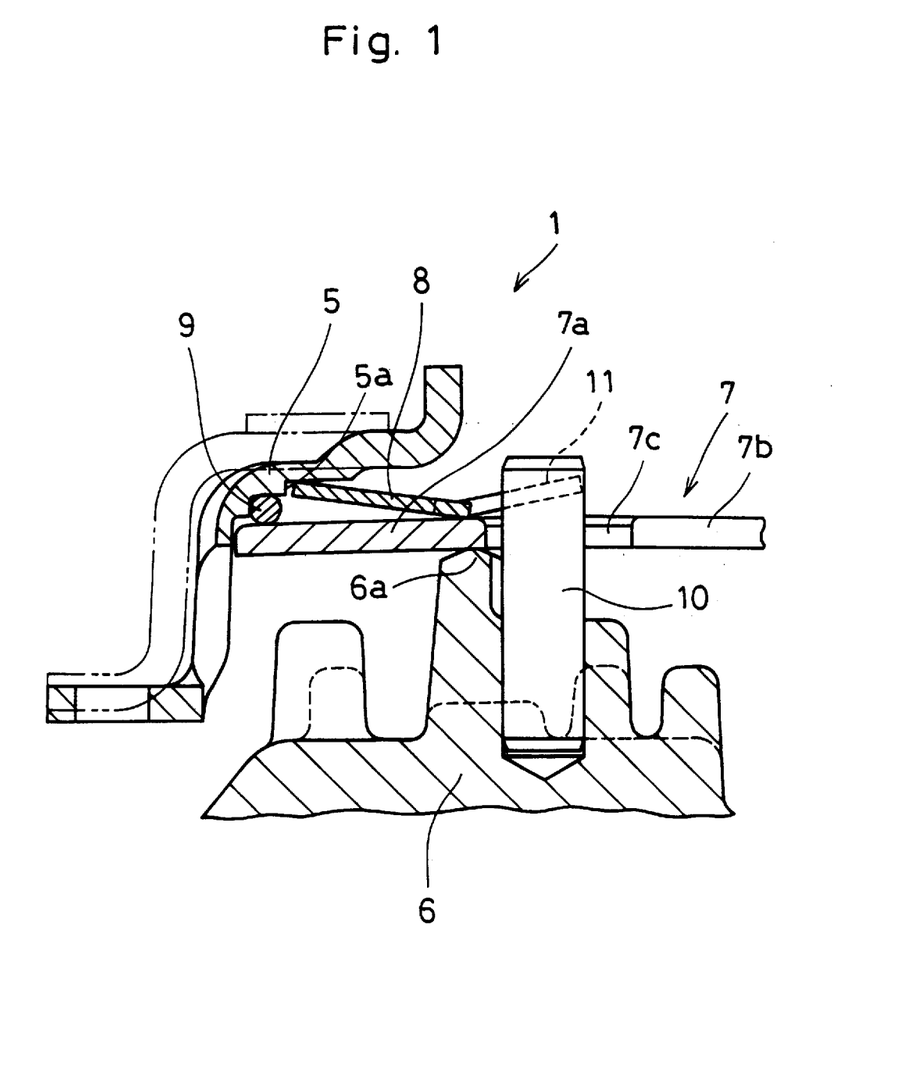
FIG. 1 is a fragmentary, cross-sectional side view of a portion of a clutch cover assembly in accordance with a first embodiment of the present invention, having a diaphragm spring and a secondary conical spring.

FIG. 1 shows a pull-type clutch cover assembly 1 in accordance with a first embodiment of the invention. FIG. 1 is oriented such that the lower portion of the pull-type clutch cover assembly 1 in FIG. 1 is adjacent to an engine and the upper portion of the pull-type clutch cover assembly in FIG. 1 is adjacent to a transmission. Hereinafter, the upper portions of FIG. 1 will be referred to as the transmission side and the lower portions of FIG. 1 will be referred to as the engine side or the flywheel side.

The clutch cover assembly 1 is a device for selectively engaging and dis-engaging frictional facings (not shown) of a clutch disc assembly (not shown) against a flywheel on the engine side.

The clutch cover assembly 1 is mainly composed of a clutch cover 5 fixed to the flywheel on the engine side, a pressure plate 6 disposed within the clutch cover 5, a diaphragm spring 7 for biasing the pressure plate 6 toward the flywheel, and a conical spring 8 interposed between the clutch cover 5 and the diaphragm spring 7.

The pressure plate 6 is a substantially annular shaped member which is mounted on the clutch cover 5 through a strap plate (not shown) in a manner known in the art. Thus, the pressure plate 6 may not rotate relative to the clutch cover 5 but is movable in the axial direction. Incidentally, the pressure plate 6 is biased upward (in FIG. 1) by a biasing force from the strap plate. The pressure plate 6 has a pressure surface (not shown) on the flywheel side (on the lower side in FIG. 1). The pressure surface is a surface for clamping the frictional facings of the clutch disc assembly in cooperation with the flywheel. Also, an annular projecting portion 6a is formed on a radially extending surface of the pressure plate 6, opposite to the pressure surface of the pressure plate 6. Also, six pins 10 are fixed at equal intervals adjacent to an inner circumferential side of the annular projecting portion 6a.

The diaphragm spring 7 has a generally flat disc-like shape and is disposed coaxially with the pressure plate 6 within the clutch cover 5. The diaphragm spring 7 is composed of an annular spring portion 7a and a plurality of lever portions 7b which extend radially inwardly from the annular spring portion 7a. The outer circumferential end of the annular spring portion 7a is supported within the clutch cover 5 via a wire ring 9. An inner circumferential end of the annular spring portion 7a is in contact with the annular projecting portion 6a of the pressure plate 6 to thereby bias the pressure plate toward the flywheel (not shown). Oblong holes 7c are formed between proximal portions on the outer circumferential side of the respective lever portions 7b. The pins 10 fixed to the pressure plate 6 penetrate the oblong holes 7c. The diaphragm spring 7 rotates together with the pressure plate 6 due to engagement between the pins 10 and the holes 7c. The inner circumferential ends of the lever portions 7b are connected to a release device (not shown), the release device being configured to pull the lever portions 7b toward the transmission side to dis-engage the pressure plate 6 from engaging the clutch disc assembly (not shown) with the flywheel (not shown).

Figure 2:
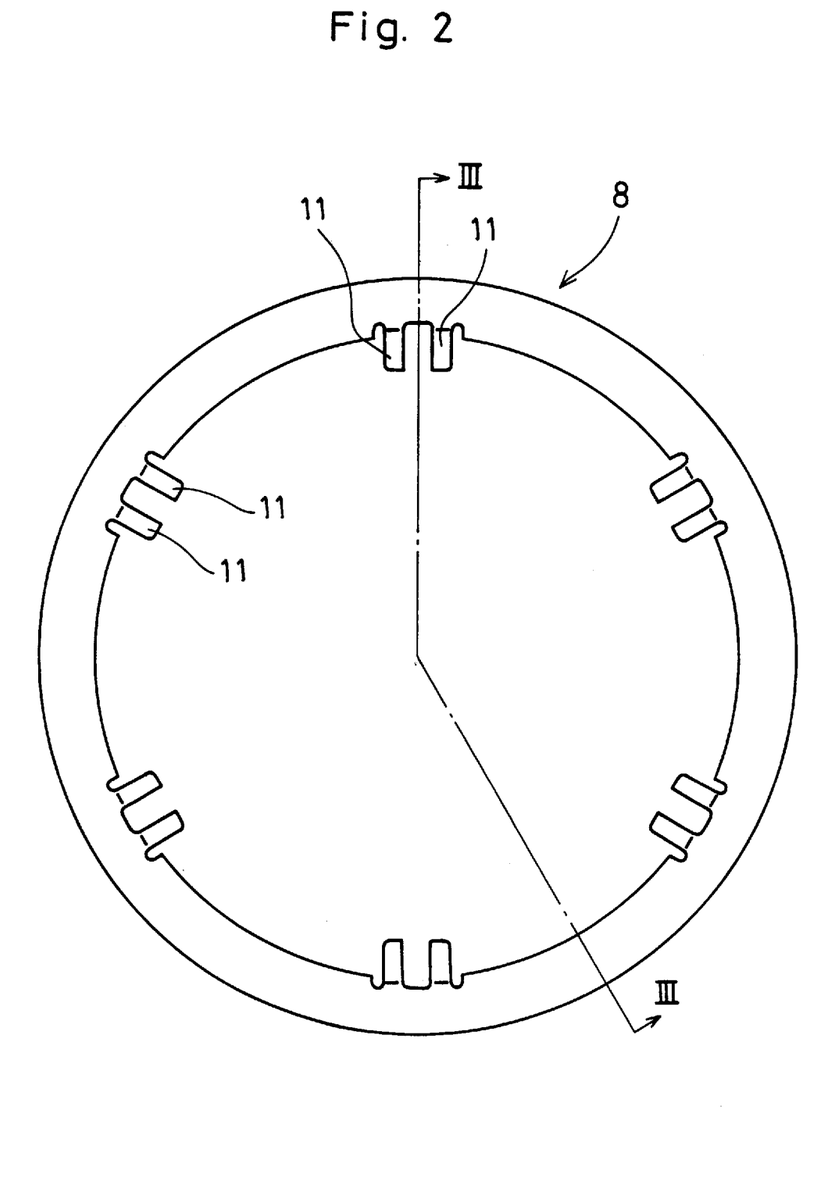
FIG. 2 is an end elevational view of the conical spring shown removed from the clutch cover assembly depicted in FIG. 1.
Figure 3:
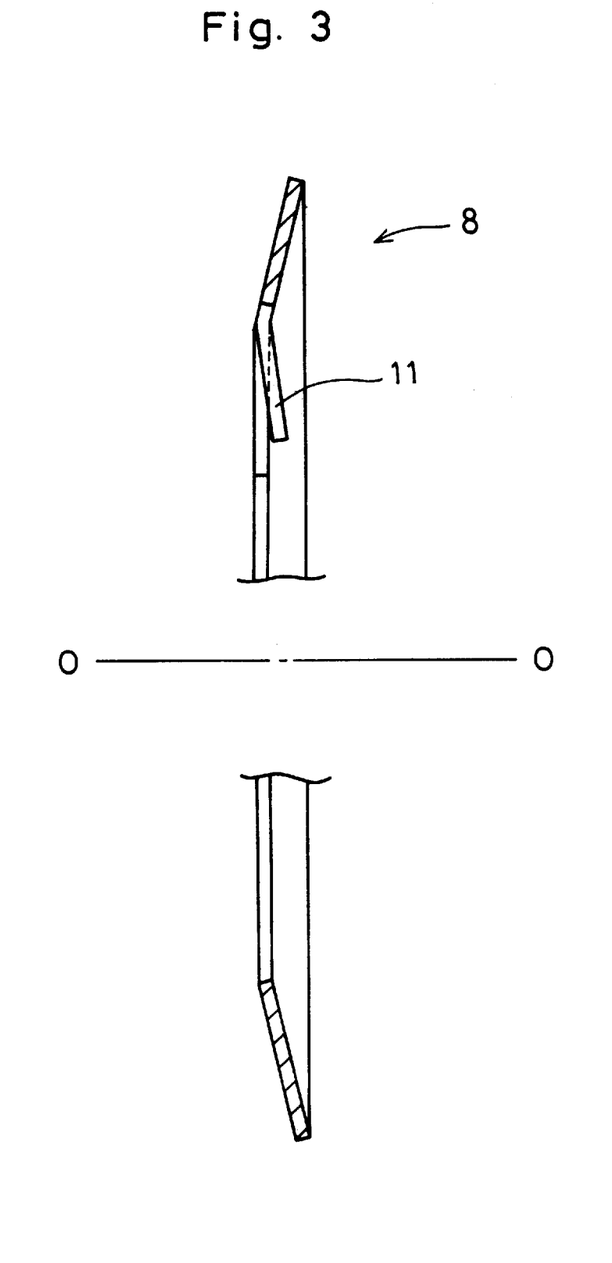
FIG. 3 is a fragmentary, cross-sectional view of the conical spring depicted in FIG. 2, taken along the line III—III in FIG. 2.

The conical spring 8 is disposed within the clutch cover 5 with its outer circumferential portion being retained within a recess 5a formed within a portion of the clutch cover 5 and with its inner circumferential portion engaging the inner circumferential portion of the annular spring portion 7a, and further biasing the inner circumferential portion of the annular spring portion 7a toward the pressure plate 6. As shown in FIG. 2, six pairs of claw portions 11 are formed, respectively, at generally equal intervals in the circumferential direction on the inner circumferential portion of the conical spring 8. The tip ends of the claw portions 11 obliquely extend toward the transmission, as shown in the upper side in FIG. 1, being configured for engagement with each circumferential side of the pins 10.

The operation will now be described.

In this embodiment, the inner circumferential portion of the conical spring 8 pushes the pressure plate 6 toward the flywheel in cooperation with the diaphragm spring 7. When the clutch assembly is in an engaged state, the engaging load that acts on the pressure plate 6 is a composite pressure load composed of the force from the conical spring 8 and the diaphragm spring 7. Since the force is supplied from two springs, the overall biasing force is increased. Also, as a result of the combination of the characteristics of the two springs, the frictional wearable portions of the clutch disc assembly (not shown) may be larger than in prior art configurations. In addition, it is possible to ensure improved pressure load characteristics in which a load changes are suppressed.

When the operator steps the clutch pedal, the release device (not shown) moves the tip ends of the lever portions 7b of the diaphragm spring toward the transmission side. As a result, the pressure load of the conical spring 8 and the diaphragm spring 7 against the pressure plate 6 is released. As a result, by the spring force of the strap plate (not shown), the pressure plate 6 is separated away from the frictional facings to thereby release the clutch.

Figure 4:
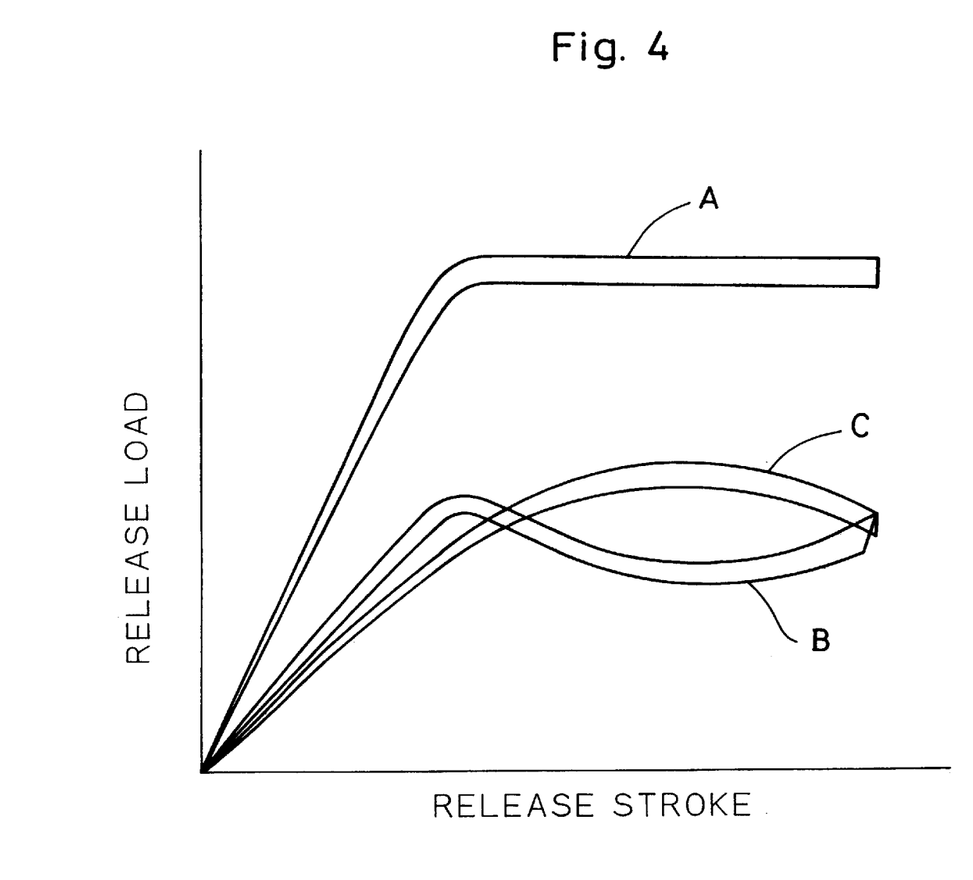
FIG. 4 is a graph showing the release load characteristics of the diaphragm spring and the secondary conical spring of the clutch cover assembly depicted in FIG. 1, and showing the combined release load characteristics of the diaphragm spring and the secondary conical spring.

The release characteristics of the clutch cover assembly 1 are shown in FIG. 4 and are described below.

A curve B in FIG. 4 represents the release load characteristics of the diaphragm spring 7 alone. A curve C in FIG. 4 represents the release load characteristics of the conical spring 8 alone. The curve A in FIG. 4 represents the combined overall release load characteristics of both the release load characteristics of the diaphragm spring 7 and the conical spring 8. With respect to a release stroke (horizontal axis in FIG. 4) or displacement of the diaphragm spring 7, the composite release load characteristics A shows a generally continuous, even response after the release stroke has exceeded a predetermined level due to the combined release load characteristics of the conical spring 8 the diaphragm spring 7. As a result, a clutch operator can obtain generally stable clutch operation.

The claw portions 11 are engaged with the pins 10. Accordingly, the conical spring 8 is held unrotatable relative to the pressure plate 6. Accordingly, it is unnecessary to use a support member such as a support ring. The claw portions 11 are simple in structure and will not adversely affect the load characteristics or strength of the body of the conical spring 8.

It should be apparent that the shape of the claw portions 11 is not limited to that shown in the embodiment.

Figure 5:
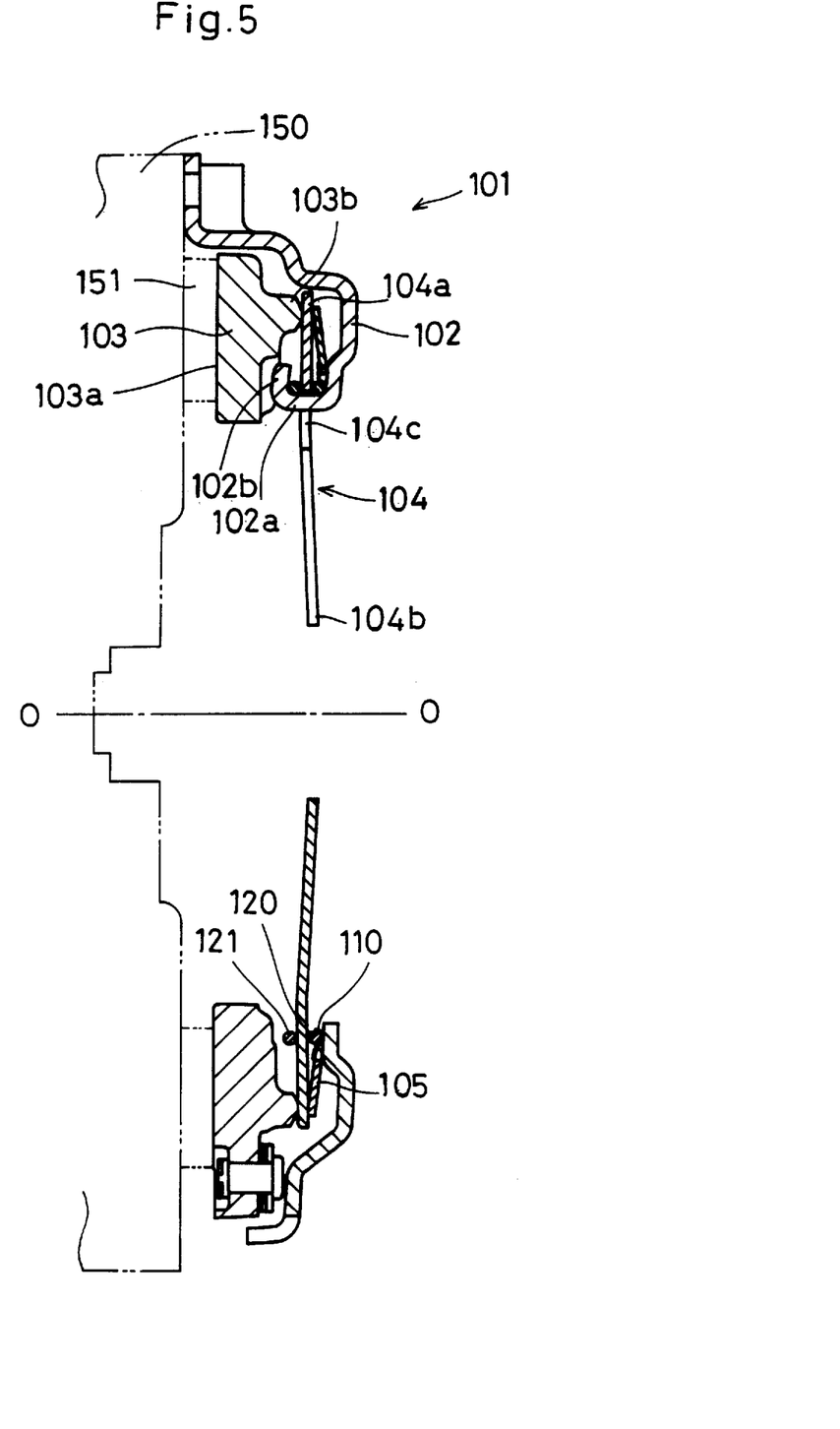
FIG. 5 is a cross-sectional side view of a clutch cover assembly in accordance with a second embodiment of the present invention, having a diaphragm spring, a secondary conical spring and a support plate.

FIG. 5 shows a push-type diaphragm type clutch cover assembly 101 in accordance with a second embodiment of the present invention. The clutch cover assembly 101 is a device for selectively engaging and dis-engaging a frictional member 151 of a clutch disc assembly 101 against a flywheel 150. The clutch cover assembly 101 is mainly composed of a clutch cover 102, a pressure plate 103, a diaphragm spring 104 and a conical spring 105.

The clutch cover 102 is a substantially dish-like plate member whose outer circumferential portion is fixed to the flywheel 150 by, for example, bolts. A large diameter hole is formed in the center of the clutch cover 102. Also, a plurality of tabs 102a are provided in the circumferential direction in the inner circumferential portion of the clutch cover 102. The tabs 102a are bent toward the flywheel 150. During the assembly process, the tip end portions 102b of the tabs 102a are bent radially outwardly (deformed) after insertion of a conical spring 105, a support plate 110, wire rings 120 and 121 and a diaphragm spring 104, all of which are described further below.

The pressure plate 103 is an annular member on which a pressure surface 103a is formed on a side thereof facing the flywheel 150. The frictional member 151 of the clutch disc assembly is disposed between the pressure surface 103a and the flywheel 150. Also, a projecting portion 103b projecting in the axial direction is formed on a side opposite the pressure surface 103a on the pressure plate 103.

The diaphragm spring 104 is a disc-like member which is disposed between the pressure plate 103 and the clutch cover 102 and retained within the clutch cover 102 by the tabs 102a. The diaphragm spring 104 is composed of an annular spring portion 104a, and a plurality of lever portions 104b extending radially outwardly from the inner circumferential portion of the annular spring portion 104a. The outer circumferential portion of the annular spring portion 104a is in contact with the projecting portion 103b of the pressure plate 103. The inner circumferential portion of the annular spring portion 104a is supported by the tabs 102a in the clutch cover 102 (described in greater detail below). Under this condition, the diaphragm spring 104 urges the pressure plate 103 toward the flywheel 150. Slits are formed between the adjacent lever portions 104b of the diaphragm spring 104 oblong holes 104c are formed in the circumferential portion of the slits.

The conical spring 105 is a disc-like member disposed in a compressed state between the diaphragm spring 104 and the clutch cover 102. The inner circumferential portion of the conical spring 105 is clamped between the clutch cover 102 and the support portion 110b of the support plate 110 (described in greater detail below). The outer circumferential portion of the conical spring 105 is in contact with the outer circumferential portion of the diaphragm spring 104. The conical spring 105 biases the pressure plate 103 toward the flywheel 150 through the diaphragm spring 104. Also, the conical spring 105 has cutaways 105a in the inner circumferential portion. The claw portions 110a (described in greater detail below) are engaged with the cutaways.

The diaphragm spring 104 and the conical spring 105 are supported to the clutch cover 102. The support structure therefor will now be described.

Figure 6:
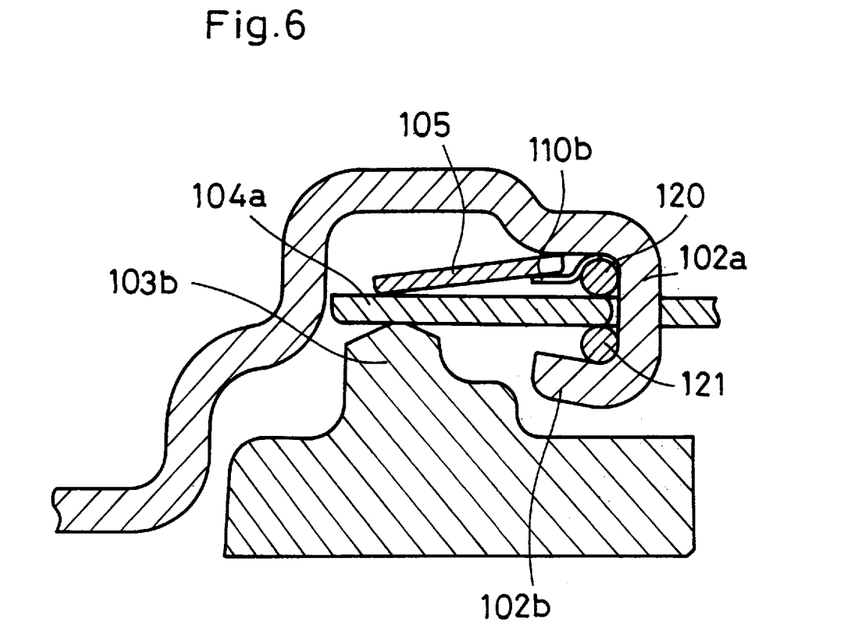
FIG. 6 is a fragmentary, cross-sectional view of a portion of the clutch cover assembly depicted in FIG. 5, on a slightly enlarged scale.
Figure 7:
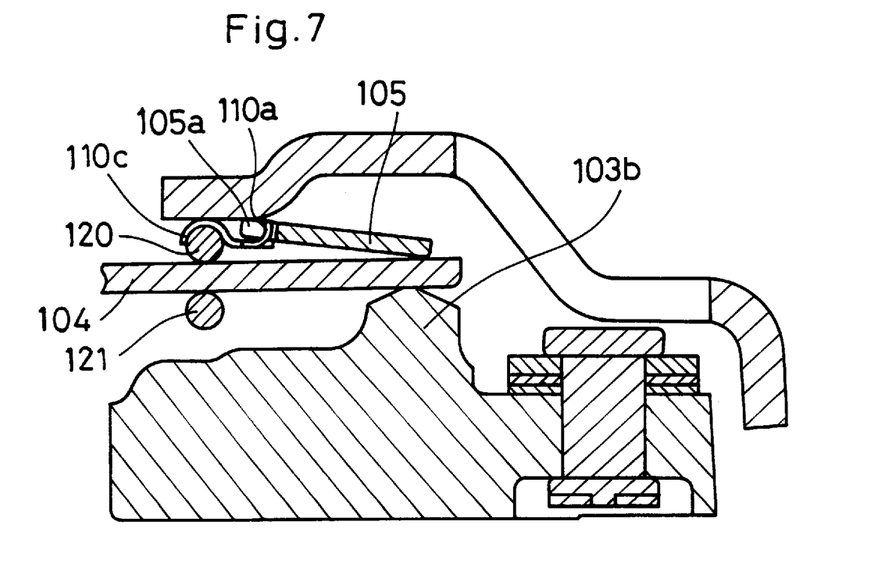
FIG. 7 is a fragmentary, cross-sectional view of another portion of the clutch cover assembly depicted in FIG. 5, on a slightly enlarged scale.

As shown in FIGS. 6 and 7, the annular components, i.e., the conical spring 105, the support plate 110, the wire ring 120, the diaphragm spring 104 and the wire ring 121 are arranged in order radially outwardly of the tabs 102a of the clutch cover 102 from the side of clutch cover 102. After the assembly of these components, the tip end portions 102b of the tabs 102a are bent radially outwardly thereby being deformed. Arcuate portions 110c (described below) of the support plate 110, the wire ring 120, the inner circumferential portion of the annular spring portion 104a of the diaphragm spring 104 and the wire ring 121 are clamped between the tip end portions 102b of the tabs 102a and the inner circumferential portion of the clutch cover 102. Thus, the diaphragm spring 104 is supported in the clutch cover 102.

Figure 8:
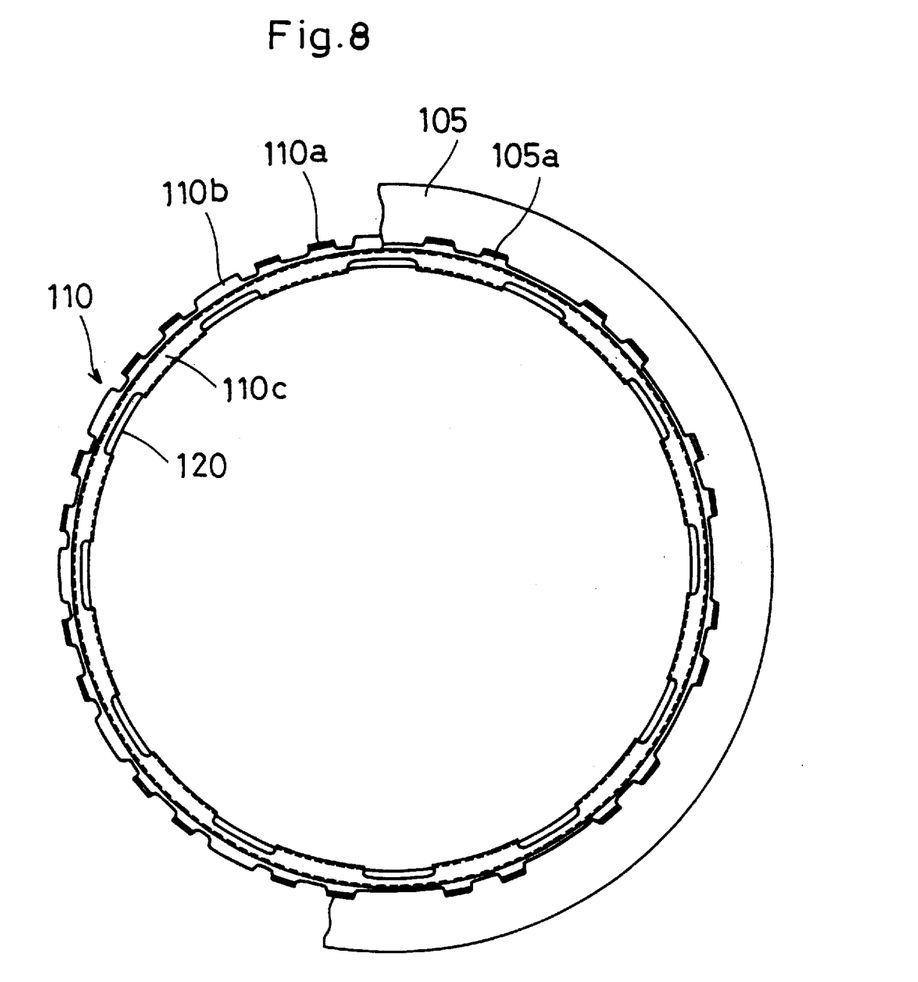
FIG. 8 is a fragmentary, elevational view of the support plate and the conical spring shown removed from the clutch cover assembly depicted in FIGS. 5, 6 and 7.

The support plate 110 is an annular plate having claw portions 110a bent in its outer circumferential portion toward the conical spring 105 and support portions 110b. The support plate 110 has, in the inner circumferential portion, the arcuate portions 110c having a diameter corresponding to the diameter of the wire ring 120. The claw portions 110a are engaged with the cutaways 105a of the conical spring 105. The support portions 110b clamp the inner circumferential portion of the conical spring 105 against the inner circumferential portion of the clutch cover 102, and further bias the inner circumferential portion of the conical spring 105 toward the clutch cover 102. Thus, the conical spring 105 is supported in the clutch cover 102. The arcuate portions 110c are engaged with the wire ring 120 and are clamped between the wire ring 120 and the inner circumferential portion of the clutch cover 102. The inner circumferential portion of the annular spring portion 104a of the diaphragm spring 104 is supported on either sides by the wire rings 120 and 121. Under the state where diaphragm spring 104 is clamped between the wire rings 120 and 121, the tabs 102a are caused to pass through the holes 104c. The inner circumferential edges of the wire rings 120 and 121 are in contact with the tabs 102a. Thus, the radial displacement of the wire rings 120 and 121 is prevented. Further details of the wire ring 120, the conical spring 105 and the support plate 110 are shown in FIG. 8.

In this embodiment, since the conical spring 105 of the clutch cover assembly 101 is so constructed that the claw portions 110a of the support plate 110 are engaged with the cutaways 105a of the conical spring 105, it is possible to prevent the generation of noises caused by the rotation of the conical spring 105. Also, since the support portions 110b clamp the inner circumferential portion of the conical spring 105 in cooperation with the inner circumferential portion of the clutch cover 102 and bias the inner circumferential portion of the conical spring 105 toward the clutch cover, it is possible to prevent the generation of the displacement of the conical spring 105 in the axial direction of the clutch.

The engagement/release operation of the clutch will now be described.

In the clutch cover assembly 101, under the condition where no dis-engaging load is applied to the tip ends of the lever portions 104b of the diaphragm spring 104 by the release device (not shown), force is applied to the pressure plate 103 by the diaphragm spring 104 and the conical spring 105. As a result, the fictional member 151 of the clutch disc assembly is pushed against the flywheel 150, and a torque is transmitted to the clutch disc assembly. At this time, the pressure load applied to the pressure plate 103 is a combination of the biasing force of the diaphragm spring 104 and the biasing force of the conical spring 105. Thus, the overall composite biasing force is increased. Also, by combining the characteristics of the two components, it is possible to obtain a more desirable pressure load in which the biasing forces are generally continuous within typical operating conditions, thus improving response and operation and further prolonging the wearable portion of the frictional member 151.

When the release device (not shown) pushes the tip end portions of the lever portions 104b of the diaphragm spring 104 toward the flywheel 150, the outer circumferential portion of the diaphragm spring 104 is raised toward the clutch cover 102 about the wire ring 121 as a fulcrum. Thus, the pressure to the pressure plate 103 is released, the frictional member 151 is separated from the flywheel 150 to dis-engage the transmission of the torque through the clutch disc assembly 101.

The release characteristics of the clutch cover assembly 1 will be explained with reference to FIG. 4.

A curve B indicates the release load characteristics in the case where the diaphragm spring 104 is used independently. A curve C indicates the release load characteristics in the case where the conical spring 105 is used independently. A curve A indicates the overall release load characteristics obtained by combining the release load characteristics of the diaphragm spring 104 and the conical spring 105. The composite release load characteristics A may be flat after the release stroke has exceeded a predetermined level, since a portion where the load is large in the release load characteristics C of the conical spring 105 is combined with an force diminishing portion of the release load characteristics B of the diaphragm spring 104. As a result, the operator may obtain the stable clutch operation.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A clutch cover assembly for engaging and dis-engaging a clutch disc from a flywheel, comprising:

a clutch cover configured for connection to a flywheel;

a pressure plate disposed within said clutch cover;

a diaphragm spring having an annular spring portion, an outer circumferential portion thereof being supported by a portion of said clutch cover, an inner circumferential portion of said annular spring portion biasing said pressure plate toward the flywheel, and said diaphragm spring having a plurality of lever portions extending radially inwardly from said annular spring portion, wherein a plurality of holes are formed in said diaphragm spring, one of said holes formed between each adjacent pair of said lever portions;

a plurality of pins extending in a generally axial direction from a surface of said pressure plate toward said clutch cover, each of said pins extending through a corresponding one of said holes in said diaphragm spring; and a conical spring disposed between said diaphragm spring and an inner surface of said clutch cover, an inner circumferential portion of said conical spring biasing an inner circumferential portion of said annular spring portion toward said pressure plate, and said inner circumferential portion of said conical spring being formed with a plurality of engagement portions which engage said pins such that said conical spring and said diaphragm spring are circumferentially constrained with respect to said pressure plate.

2. The clutch cover assembly according to claim 1, wherein said engagement portions each comprises a pair of axially extending claw portions in contact with said pins.

* * * * *

UNITED STATES PATENT AND TRADEMARK OFFICE
Certiicate

Patent No. 5,826,691

Patented: October 27, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Masaaki Asada, Ibaraki, Japan; Toshiya Kosumi, Kadoma, Japan; and Hideyuki Imanaka, Moriguchi, Japan.

Signed and Sealed this Twenty-Eighth Day of November, 2000.

CHARLES A. MARMOR, *SPE*
Art Unit 3681